United States Patent [19]

Gorchev et al.

[11] 4,223,832
[45] Sep. 23, 1980

[54] DAMPER FOR AN AIR DISTRIBUTION SYSTEM

[75] Inventors: Dimiter Gorchev, Boston; Thomas P. Rodgers, Nahant; Herbert L. Willke, Jr., Cambridge, all of Mass.

[73] Assignee: Mitco Corporation, Somerville, Mass.

[21] Appl. No.: 944,135

[22] Filed: Sep. 20, 1978

[51] Int. Cl.³ ............................................. F24F 13/10
[52] U.S. Cl. ...................................... 236/49; 251/215; 251/228
[58] Field of Search ................... 236/49; 251/215, 228, 251/279; 165/16; 74/25; 49/248, 344

[56] References Cited

U.S. PATENT DOCUMENTS

| 2,535,525 | 12/1950 | Wolfe | 251/228 |
|---|---|---|---|
| 2,674,412 | 4/1954 | Early et al. | 251/228 X |
| 3,241,568 | 3/1966 | Mayo, Jr. | 251/228 X |
| 3,658,293 | 4/1972 | Gaebel | 251/228 |
| 3,843,090 | 10/1974 | Schneider | 251/215 |
| 3,982,583 | 9/1976 | Shavit | 165/16 |
| 4,065,097 | 12/1977 | Timin | 251/228 |

Primary Examiner—Albert J. Makay
Assistant Examiner—William E. Tapolcai, Jr.
Attorney, Agent, or Firm—Kenway & Jenney

[57] ABSTRACT

A damper assembly for an air passage. A damper assembly includes a disk element associated with a circular orifice of an air passage, and an actuator having an associated drive element. The disk is coupled to the drive element and a fixed reference point by a linkage so that as the actuator drive element is displaced from a first limit position to a second limit position, the disk moves between a sealing position and an open position. In the sealing position, the disk perimeter is flush against the perimeter of the orifice establishing an air-tight seal between the disk and the perimeter of the orifice. In an open position, the disk is displaced from the orifice perimeter and forms an angle with a plane defined by the orifice perimeter. An array of damper assemblies may be configured with a controller for selectively controlling the position of each actuator between the respective limit positions.

23 Claims, 11 Drawing Figures

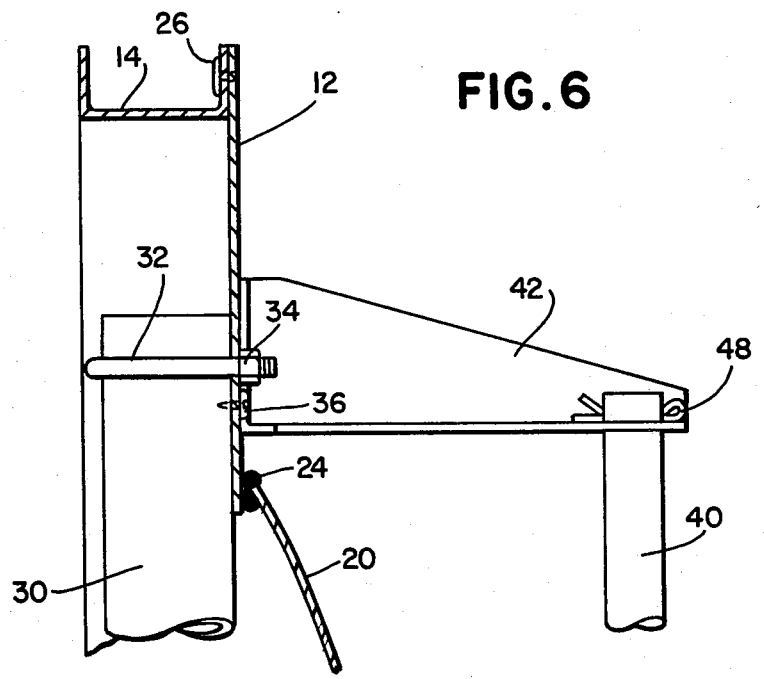
FIG. 6
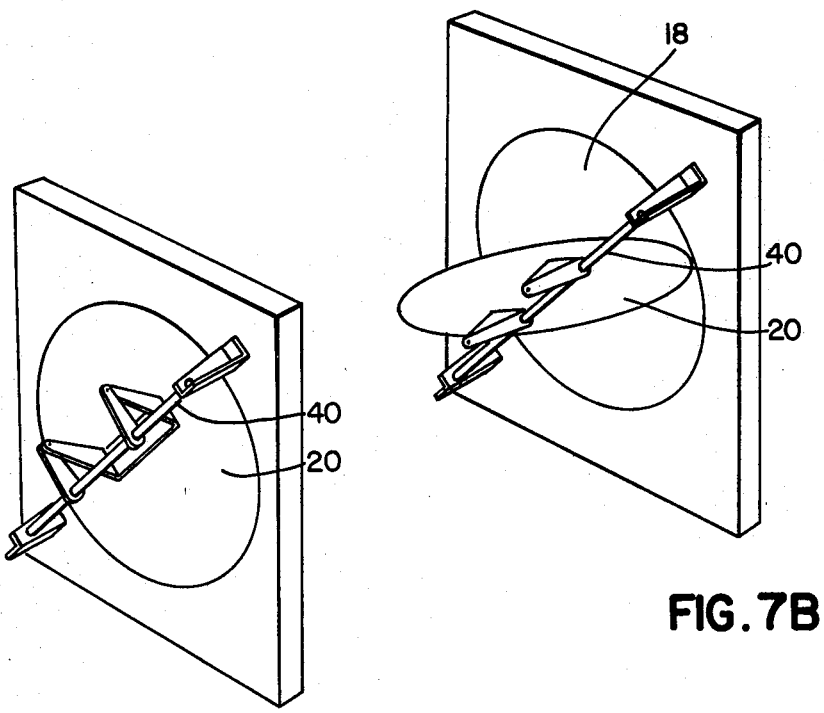
FIG. 7A
FIG. 7B

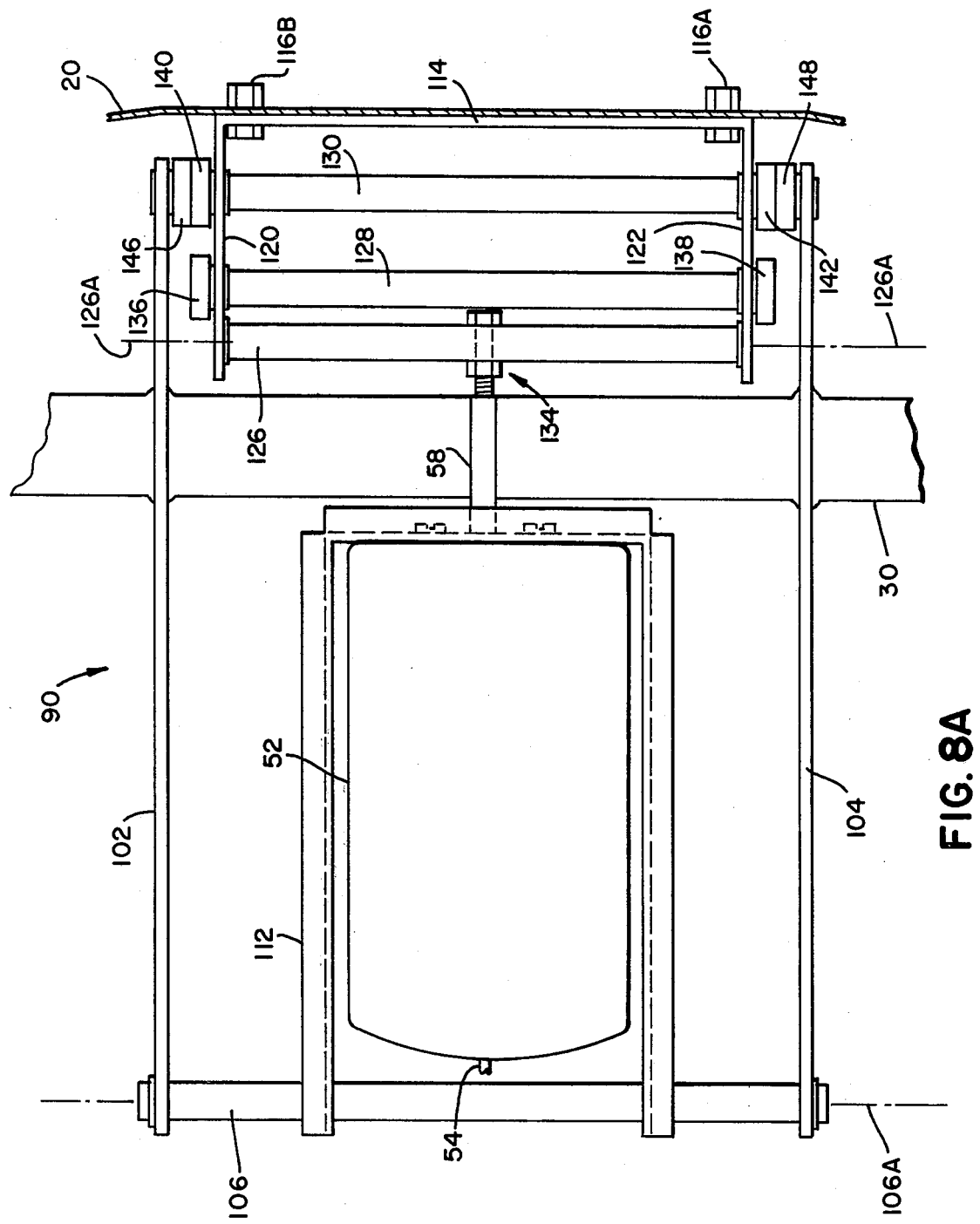

DAMPER FOR AN AIR DISTRIBUTION SYSTEM

BACKGROUND OF THE INVENTION

The invention relates generally to air distribution systems for buildings, and particularly to outside air dampers for such systems.

Many large modern buildings are constructed as sealed units with an air distribution system having a central source providing conditioned (heated or cooled as required) return air which is mixed with outside air. The mixed air is then circulated through the building. The control of the outside air flow is essential in order to establish an energy efficient operation.

Under some circumstances, it may be desirable to draw a large amount of outside air for mixing with conditioned and return air from the building. However, at other times, no outside air is needed and in fact outside air is detrimental in the sense that so great a difference may exist between the conditions of the outside air and the air being circulated in the building that a mixture of outside and inside air would be energy-wasting. Under the latter conditions, a means of closing off, or damping, the air passage as completely as possible is desirable.

In the prior art, several approaches have been taken to achieve control of the admission of outside air to a building air distribution system. In one such system, elongated blades have been used in venetian blind-like configurations, together with elongated sealing gaskets located between the blades. However, such damper systems are subject to substantial leakage, particularly in embodiments where the length-to-width ratio of the blades is relatively large. Such leakage may be due to deficiencies in blade trueness or alignment.

An alternative prior art approach incorporates a bank, or array, of disk elements, each of which is aligned with a coaxial one of a corresponding array of circular openings. In this approach exemplified by an array of type 106 orifice valves, manufactured by Mitco Corporation, Somerville, Massachusetts, an actuator selectively translates the disk elements along their axes between a first position seated against their respective circular opening and a second position displaced from that opening. When the disk elements are seated against the openings, an efficient seal is established, and when the elements are displaced from the openings, outside air flow is permitted. Such a disk system is highly efficient compared to the blade approach with respect to leakage, since in the disk system, the closure force is applied to the center of the disk and that force is transferred to the disk edges at the sealing point in a manner substantially independent of an angle. However, this system is inefficient in terms of required damper area to provide a desired air flow when open due to the blockage in air flow path caused by the disk elements.

Accordingly, it is a purpose or object of the invention to provide an improved air valve for use in an air damper system.

It is another object to provide an improved outside air damper system for controlling the admission of outside air to the air distribution system of a building.

SUMMARY OF THE INVENTION

In one form of the present invention, an outside air damper has a fixed plate having a perimeter portion defining an opening, or orifice. The orifice perimeter is preferably circular, although in some forms the perimeter may be elliptical.

The damper further includes a disk-like closure element having a perimeter seatable on the outside of the plate perimeter portion, an actuator for selectively directing a driving element between a first and second limit position. The disk element is coupled to the driving element and a reference point by a linkage assembly. With this configuration, as the driving element is directed by the actuator between its first and second limit position, the closure element moves between a closed position having the disk perimeter flush with the orifice, and a second position displaced from the plate and forming an angle with a plane defined by the orifice perimeter. With this configuration, as the disk element is moved from its closed position, it first lifts off the orifice perimeter, breaking the seal, and then continues to move away from the orifice while at the same time rotating about an axis parallel to the plane of the orifice. As the rotation increases, the impedance to air flow through the orifice is reduced.

An array of such outside air dampers may be configured with a controller adapted to selectively control the position of the driving elements of the respective actuators. In this configuration, proportionate control of the various damper assemblies may be achieved to accommodate desired flow of outside air.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 6 is a sectional view along the lines 6—6 of FIG. 3;

FIGS. 7A and 7B are perspective views of the damper assembly of FIG. 1 in the closed and full open positions, respectively;

FIGS. 8A and 8B show top and side elevation views, respectively, of an alternative actuator, linkage and disk assembly for the damper assembly of FIG. 1.

DESCRIPTION OF A PREFERRED EMBODIMENT

Figure 1:
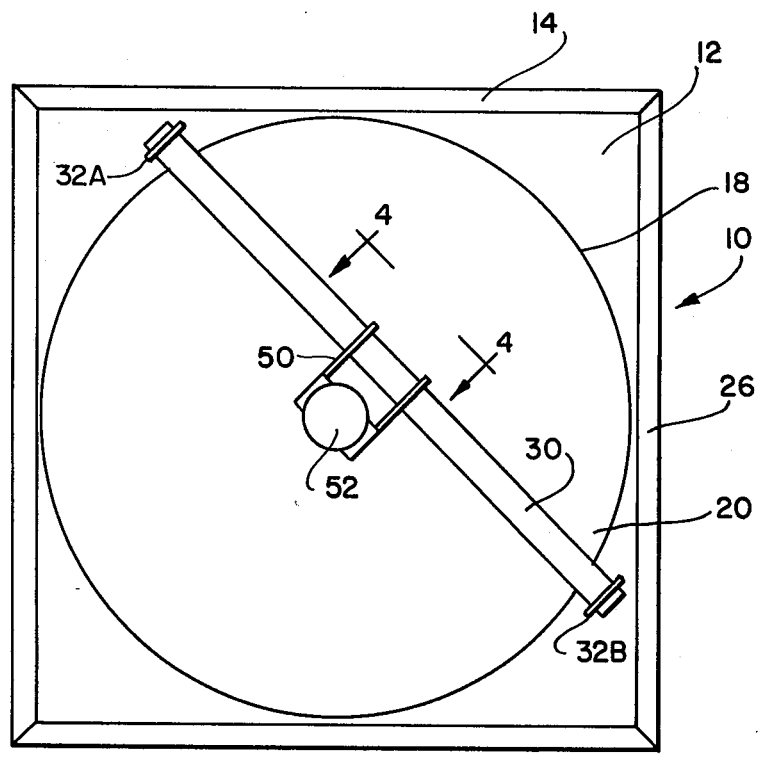
FIG. 1 is an elevation view of a damper assembly, looking from outside the air intake chamber.
Figure 2:
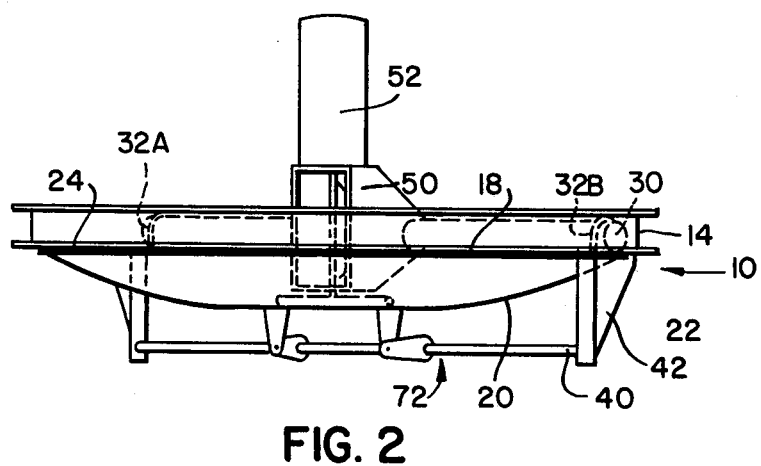
FIG. 2 is a top view of the assembly of FIG. 1.
Figure 3:
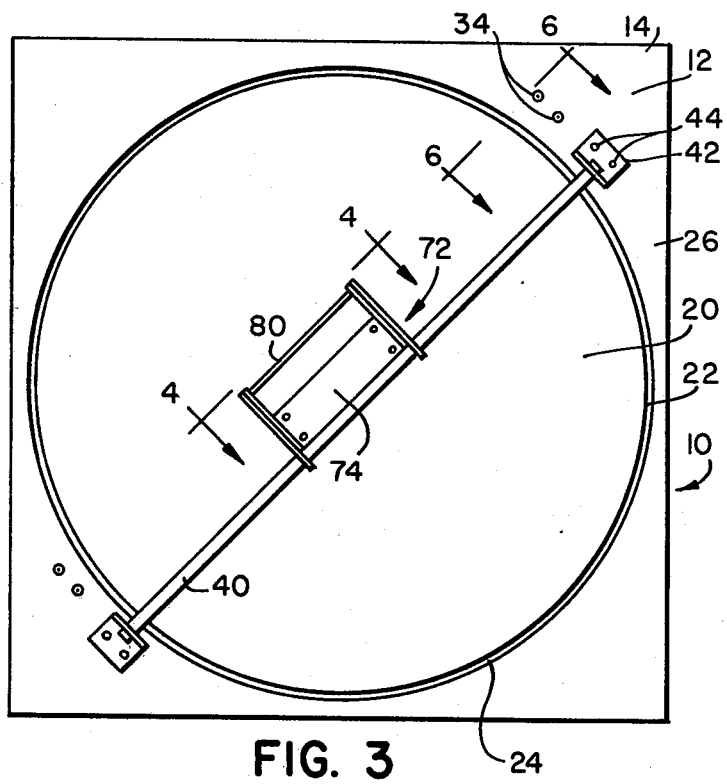
FIG. 3 is an elevation view of the assembly of FIG. 1, as seen from inside the air intake chamber.

FIGS. 1-6 show an exemplary damper assembly 10 in accordance with the present invention. As illustrated in these figures, the damper 10 is in the closed position. Damper 10 includes a plate 12 with a strengthening frame 14. The plate 12 has a perimeter portion defining a circular opening 18. A dish-shaped disk 20 is shown with its outer perimeter 22 seated on an elastomer gasket 24 mounted on the perimeter portion of the plate 12. In alternative embodiments, the gasket 24 may be mounted on the perimeter of disk 20.

For the sake of showing the proper relationship between the elements of the present embodiment, dimensions applicable to this one embodiment will be given. The plate 12, for example, is made of ⅛" aluminum, and is approximately 36" high and 36" wide. The radius of the circular opening 18 in the plate 12 is about 34". The closure element, or disk 20 is made of sheet aluminum. In the present embodiment, disk 20 is a spherical shell section, i.e. essentially dish-shaped, with a 4" height and having its concave side extending toward the exterior (i.e. outside air side) of the damper assembly. The diameter of the disk 20 is about 35", thereby overlapping the circular opening 18 when coaxial with opening 18 and flush with plate 12. In this configuration, with disk 20 in its open position, outside air flows through the opening 18 into the air intake chamber with the concave surface of the disk deflecting that air. In some cases, the open limit position for the disk 20 may be selected so that desired mixing may occur between the air flowing through opening 18 and return air ducted into the interior of the air intake chamber.

Figure 9:
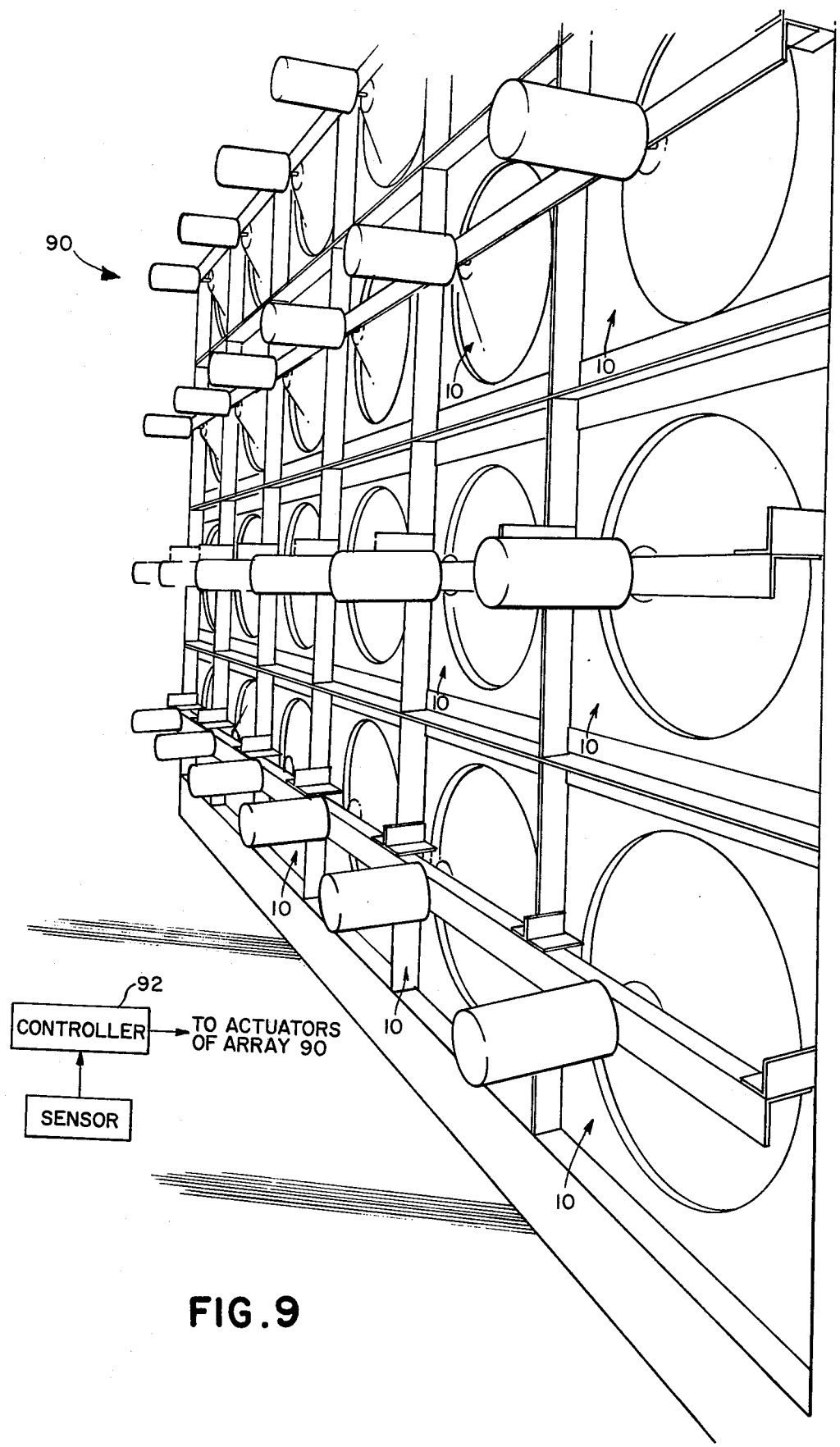
FIG. 9 shows a controlled array of the damper assemblies, each having a form similar to the damper assembly shown in FIGS. 1-6.

In alternative embodiments, such as that shown in FIG. 9, described below, the disk 20 may have its concave side extending toward the interior of the damper assembly. In still other embodiments, the disk 20 may be substantially flat.

The frame 14 is an aluminum channel with dimensions of about 1" in height and 2" in depth. The frame 14 is connected to the plate 12 with fasteners or rivets (exemplified by the rivet 26 in FIG. 1). There are two support rods fixed to the plate 12 of the damper assembly 10 for supporting the active elements of the assembly.

The first support rod 30 is positioned on the inside of damper 10 in order to support the actuator as described below. In the present embodiment, rod 30 is a 1¾" aluminum tube mounted across the rear of the opening 18 of the plate 12. Rod 30 extends directly across the opening 18, slightly off center, and is fastened to the plate 12 on either side of the opening 18 by U-bolts 32A and 32B, and associated nuts 34. A screw fastener 36 (shown in FIG. 6) passes through the plate 12 and into rod 30 to resist any turning torque in rod 30.

The second support rod 40 is a linkage support and is a ½" standard pipe in the present embodiment. The position of rod 40 is established by angle members 42 on either side of the opening 18. The angle members 42 are connected to the plate 12 by spot welds 44. The rod 40 passes through holes 46 of the angles 42 and is restrained on the other side of angles 42 by cotter pins 48 (shown in FIG. 6). With this configuration, rod 40 extends across opening 18 outside of and approximately 7 inches from that opening.

Figure 4:
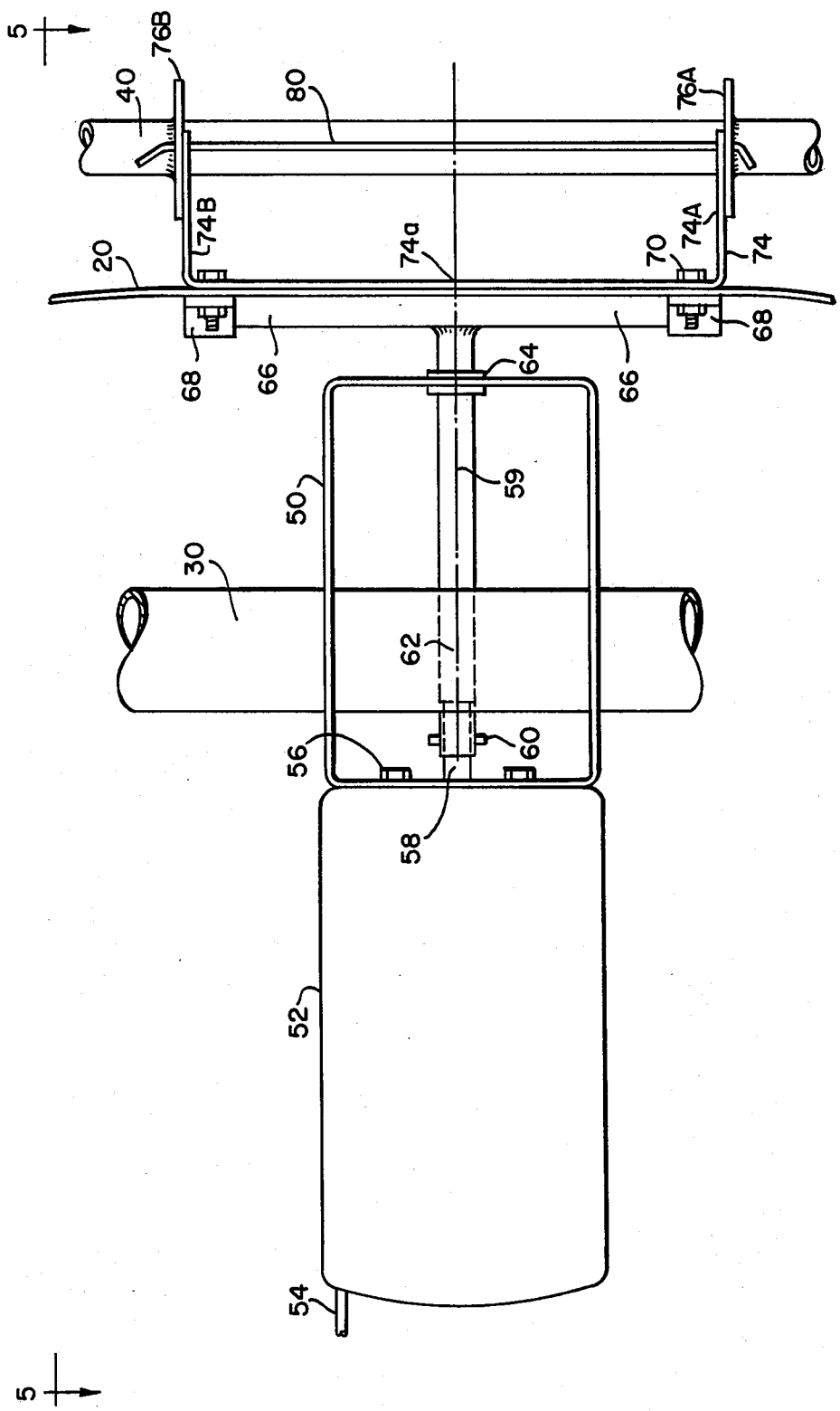
FIG. 4 is a detailed view of a section of the assembly of FIG. 1 along the lines 4—4.
Figure 5:
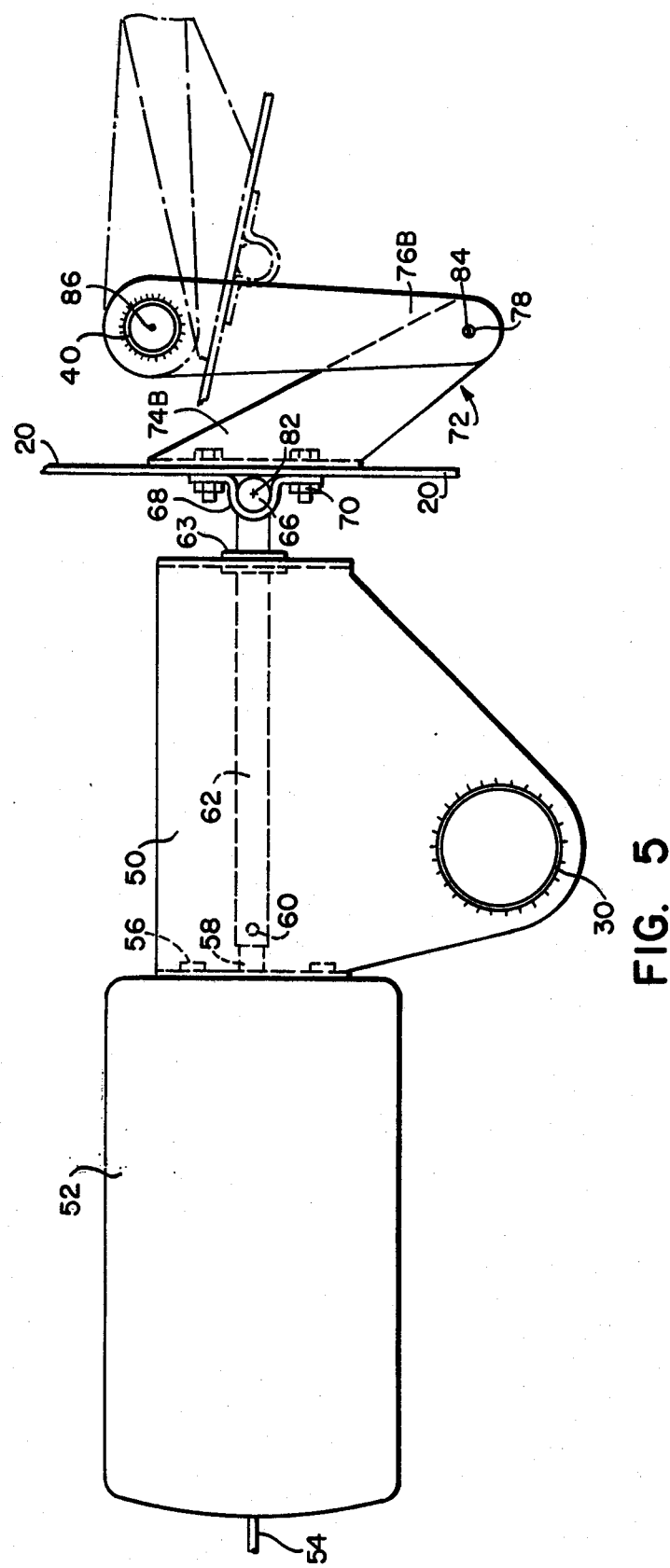
FIG. 5 is a top view of the section of FIG. 4 along the lines 5—5.

Details of the preferred embodiment near the center of the assembly are shown in FIGS. 4 and 5. Turning to those figures, an actuator support member 50 is affixed to the actuator support rod 30. A pneumatic actuator 52, and associated air hose 54, is mounted on the support member 50 by fasteners 56. Actuator 52 includes a drive element or rod 58 which is adapted for movement between two limit positions along an actuator axis 59. Rod 58 is coupled to disk 20 by a first linkage assembly. This first linkage assembly includes a steel "T" bar having a shaft 62 coupled by pin 60 to rod 58 and passing through a bushing 63 mounted on support member 50. The actuator mount and bushing 63 constrain shaft 62 to linear motion along its central axis.

The shaft 62 is joined at a T-connection 64 to a disk mounting shaft 66. The disk mounting shaft 66 is mounted to the inside face of the disk 20 substantially at its center. The connection is made by way of straps 68 wrapped around the ends of the shaft 66. The straps 68 are secured on either side of the shaft 66 to the disk 20 by bolts 70 in a manner providing enough clearance so that the shaft 66 may rotate freely within the straps 68 about a pivot axis 82 which is perpendicular to and intersects with the actuator axis 59. With this configuration, the shaft 66 provides a pivotal coupling between rod 58 and the center of the disk 20 about axis 82.

The disk 20 is supported by a second linkage assembly 72 connected to the linkage support rod 40. The fasteners 70 attaching the straps 68 to the disk 20 pass through to also attach part of a linkage assembly 72 to the disk 20. The linkage assembly 72 consists essentially of two principal elements. One is the element 74 connected directly to the face of the disk 20 at its center and having a body 74A and a pair of arms 74B extending transversely away from the disk 20 along axes forming a predetermined angle with disk 20. The other element is a pair of arms 76A and 76B rigidly affixed to the linkage support rod 40, as by welds. The transverse arms 74B fit between the arms 76A and 76B connected to the linkage support rod 40. The arms 74A and 76A are pivotally connected to each other, as are the arms 74B and 76B. In the illustrated embodiment, these pivotal connections are provided by a thin rod 80 which passes through hole 78 in arms 74A and 76A at one end of rod 80 and through corresponding holes in arms 74B and 76B at the other end of rod 80. The rod 80 is bent on the outside of the arm overlap to keep the rod 80 in place. In effect, the arms 74A, 74B, 76A and 76B form a two-bar linkage, with the first bar having one end fixedly coupled to disk 20, and the other end pivotally coupled to the second bar. The second bar has its other end pivotally coupled by rod 40 about a reference axis 86 which is perpendicular to the actuator axis and is fixed with respect to plate 12. The arms 76A and support rod 40 and pins 48 form a base pivot member which is pivotable about the base axis 86 (which is maintained fixed with respect to the opening 18 in plate 12 by rod 30 and angle members 42.

With this configuration, there are three axes about which the various elements described above can pivot. One is the pivot axis 82 of the shaft 66 (which is rotatable within the straps 68). Another is the axis 84 of rod 80, i.e. the axis of the connection of the ends of transverse arm 74A and the arm 76A and the connection of the ends of transverse arm 74B and arm 76B. The third is the reference axis 86 of the linkage support rod 40, which is rotatable within the support holes of the angles 42. In the present embodiment, the axis 86 is perpendicular to and 1½ inches from the central axis of hole 18. The axis of rod 80 and axis 86 are 4½ inches apart, and the axis of rod 80 and axis 82 are 4¼ inches apart. Arms 74A and 74B are positioned so that each of those arms has a reference axis which passes through axes 82 and 84 and forms a 45 degree angle with respect to the central axis of the shaft 62.

The damper assembly 10 illustrated in FIGS. 1 through 6, and in FIG. 7A, shows the assembly in a "closed" position, that is, with disk 20 flush against the elastomer seal 24 on plate 12. As shown, rod 58 is positioned at its inner limit of travel. To "open" the damper assembly 10, a pneumatic control signal applied in hose 54 causes actuator 52 to drive rod 58 in the direction away from actuator 52. The force applied to rod 58 is transferred to the center of the disk 20 by means of the rod 58 and shafts 62 and 66. Initially, the disk 20 is displaced from the gasket 24 along the axis of rod 58, breaking the seal between disk 20 and gasket 24. As the pneumatic actuator 52 continues to drive rod 58 outwardly toward its outer limit of travel, the disk 20 begins to turn about the axis 82 of the cross shaft 66. The shaft axis 82 is at the same time moving away from the opening 18. In effect, the disk 20 is first lifted off the gasket 24 and then turned.

The full open position of damper assembly 10 is illustrated in the dotted configuration shown in FIG. 5 and the perspective view of FIG. 7B. As shown, the rod 58 has reached its outer limit of travel. In addition, the disk 20 is oriented approximately 90° to the plate 12, with a portion of disk 20 passing through the circular opening 18. With this configuration, the effective cross section of the disk 20 seen by air entering the damper assembly is relatively small, providing correspondingly little resistance to air flow.

If the rod 58 is then retracted to its inner limit position by actuator 52, the disk 20 returns to its closed position. As disk 20 turns from its open position, the last part of its travel results in its being pulled against the gasket 24 surrounding the circular opening 18 of the plate 12 and pressed there by the retraction of the rod 58 and shaft 62. The symmetry of the disk 20 about its center with the returning force of the rod 58 being placed at the center of the disk 20 means that the force sealing the disk 20 is equally distributed around its periphery 22, creating an air-tight seal. Although the present embodiment has been described in terms of excursions of disk 20 between its full open and full closed positions, the actuator 52 may readily be controlled so that rod 58 may be selectively moved between its inner and outer limit positions to achieve proportional control of the air flow through damper 10.

In the embodiments of FIGS. 1-6, the linkage which couples the drive element to the closure element (disk 20) and the reference point (axis 86) includes two portions. The first portion includes pin 60, shafts 62 and 66 and the straps 68 which establishes the pivotal connection between rod 58 and disk 20. The second portion includes shaft 40 and its mounting assembly, and arms 74A, 74B, 76A and 76B and their interconnection means. In the illustrated embodiment, the first linkage portion is on one side (the "outside") of the disk 20, and the second linkage portion is on the other side (the "inside") of the disk 20.

Figure 8B:
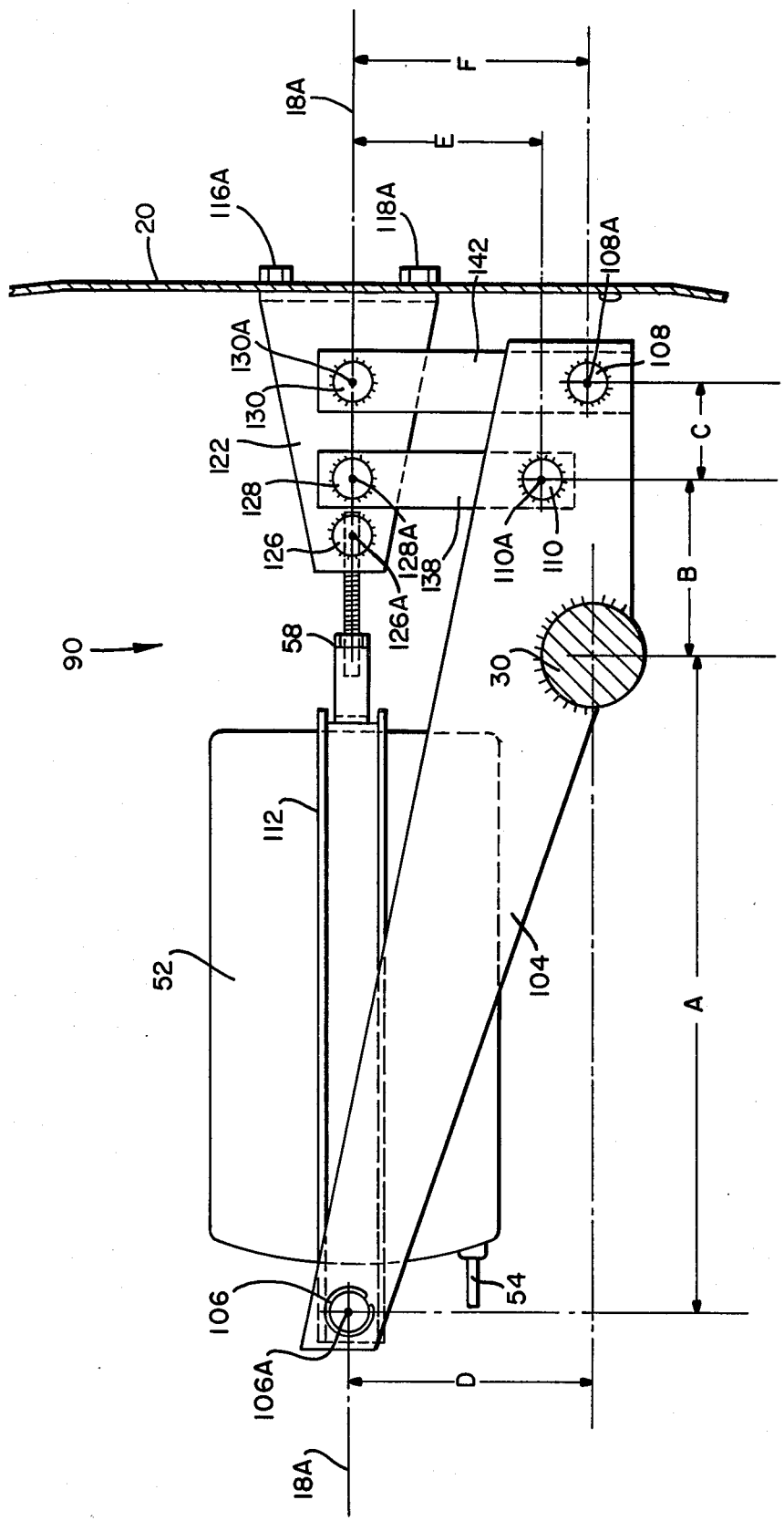

In alternative embodiments, different linkage configurations may be used in keeping with the present invention. By way of example, FIGS. 8A and 8B show such a linkage assembly 90 which is suitable for coupling rod 58, disk 20 and plate 12. In FIGS. 8A and 8B, elements corresponding to similar elements in FIGS. 1-6 are denoted by identical reference designations. The linkage assembly of FIGS. 8A and 8B (which shows the disk 20 in the closed position) is entirely on one side (the "outside") of disk 20 (i.e. on the same side as actuator 52).

In the embodiment of FIGS. 8A and 8B, a rod 30 is rigidly connected across the circular opening in plate 12, in a similar manner to that shown in the embodiment of FIGS. 1-6. A pair of brackets 102 and 104 are rigidly connected (for example, by welds) to the central portion of rod 30. Rods 106, 108 and 110 are pivotally connected about axes 106A, 108A and 110A, respectively, between the two bracket members 102 and 104. The actuator 52 is rigidly affixed to mounting bracket 112. Bracket 112 is pivotally connected about axis 106A to the rod 106. The actuator 52 is controlled by electrical signals applied by way of cable 54 in a manner similar to that in the embodiment of FIGS. 1-6.

A U-bracket 114 is affixed to the concave portion of disk 20 by upper fasteners 116A and 116B and by lower fasteners 118A and 118B. The arm portions 120 and 122 of bracket 114 extend generally perpendicular to the interior of disk 20. Cross bars 126, 128 and 130 are all pivotally connected about axes 126A, 128A and 130A, respectively, between the arms 120 and 122 of U-bracket 114.

The driving element 58 of actuator 52 is coupled by the means of a fastener assembly 134 to the rod 126. The first pair of link elements 136 and 138 are pivotally connected to the bars 110 and 128. A second pair of linking elements 140 and 142 are pivotally connected to bars 108 and 130. Spacer members 146 and 148 are positioned between link elements 140 and 102, and between linkage element 142 and bracket 104, respectively. With this configuration, the linkage assembly 90 provides a coupling between disk 20, the driving element 58 of actuator 52 and the plate 12. The link elements 140 and 142 form base pivot members which are pivotable about the base axis 108A (which is maintained fixed with respect to the opening in plate 12 by rod 30 and bracket members 102 and 104. In a similar manner, the link elements 136 and 138 form additional base pivot members which are pivotable about a second base axis 110A.

In the present embodiment of FIGS. 8A and 8B, disk 20 is a spherical shell section having a 4 inch height and a 35 inch diameter. Disk 20 is adapted for motion with respect to a 34½ inch circular hole 18 of plate 12. The bracket 122 includes mounting holes for rods 126, 128, and 130 so that the central axes 126A, 128A and 130A of those rods intersect with the central axis of disk 20 at distances 1⅛ inches, 2⅝ inches and 3⅛ inches from that disk, respectively. The brackets 102 and 104 include mounting holes for rods 30, 106, 108 and 110 so that the central axes of those rods are located in accordance with the dimensions A-F denoted in FIG. 8B, where the direction of the dimensions A-C is perpendicular to the direction of dimensions D-E. Exemplary values for these dimensions are shown in the following Table.

TABLE

| | |
|---|---|
| A | 9 3/4 inches |
| B | 2 7/16 inches |
| C | 1 ½ inches |
| D | 3 9/16 inches |
| E | 3 ½ inches |
| F | 4 inches |

The rigid junction of brackets 102 and 104 with rod 30 is adapted so that the direction of measurement of the dimensions A, B and C is parallel to the central axis 18A of hole 18 in plate 12 and so that axis 106A intersects with axis 18A. With this configuration, link elements 140 and 142 connect axes 130A and 108 with a separation of 4 inches and link elements 136 with 138 connect axes 128A and 110A with a separation of 3¼ inches.

In operation, as the driving element 58 is displaced from its closed position (as illustrated in FIGS. 8A and 8B), away from the actuator 52, the linkage assembly 90 controls the disk 20 to move from the closed position (having its perimeter flush against plate 12), initially away from plate 12 and then in a pivotal motion about an axis parallel to axis 106A so that the plane of the perimeter of disk 12 forms a non-zero angle with the plane of plate 12, with the angle being functionally related to the linear displacement of driving element 58. As with the embodiment of FIGS. 1-6, the embodiment of FIGS. 8A and 8B may be configured with desired stop members to provide limits of the open position of the disk 20. Additionally, the actuator 52 may be controlled for proportional operation in the same manner as the embodiment of FIGS. 1-6.

Typically, an array of damper assemblies 10 may be utilized in a building to provide an outside air damper system. Such an array is shown in FIG. 9. In the illustrated array 90, a controller 92 provides pneumatic control signals to the actuators of the damper assemblies 10 so that the various ones may be opened to selected intermediate positions. For example, variations in the opening of the air intake can be accomplished by full opening some but not others of the damper assemblies 10.

In alternative damper systems, different size arrays of the assemblies may be placed on different sides of the building as prevailing weather conditions suggest. Such alternative systems may have uniformly sized damper elements, as shown in FIG. 9, or in other systems, may have a selected distribution of various sized damper assemblies.

By way of example, the controller 92 may be a conventional digital computer system which has been programmed to generate the appropriate control signals for the various actuators to achieve a desired time sequence of openings and closings and degree of openings of the various damper assemblies. In alternative systems, environmental sensors may be used in conjunction with the controller, with the controller being programmed to control the damper operation in an adaptive manner. For example, such sensors may generate signals responsive to wind intensity and direction, and the controller may utilize these signals to selectively control various dampers in the array.

Other variations may occur to those skilled in the art, and the scope of the invention is meant not to be limited by the description of the preferred embodiment given above, but is defined by the following claims.

We claim:

1. A damper apparatus for an air input port of an air distribution system, comprising:
    a closure element having a perimeter portion seatable on the edge of said input port,
    an actuating means and associated driving element, including a linear actuating means for selectively moving said driving element between first and second limit positions along an actuator axis,
    linkage means for coupling said closure element to said input port whereby said closure element is driven between first and second operating positions as said driving element passes between said first and second limit positions, said closure element being seated against said input port in said first operating position, and being linearly displaced from said input port and being rotationally displaced from said first operating position about a first reference axis parallel to the plane of said input port in said second operating position, said linkage means including at least one base pivot member which is pivotable about a base axis, said base axis being fixed with respect to said input port.

2. A damper apparatus according to claim 1 wherein said linkage means comprises
    connecting means for pivotally coupling said driving element to said closure element about a coupling axis parallel to the plane of said input port,
    first and second bars, said first bar being fixedly coupled to said closure element at one end and being pivotally coupled at the other end to said second bar, and said second bar being pivotally coupled about said first reference axis.

3. A damper apparatus according to claim 1 further comprising a sealing means, said sealing means being positioned to lie between the perimeter of said closure element and the edge of said input port when said closure element is in said first operating position.

4. A damper apparatus according to claim 1 wherein said closure element is substantially a spherical shell section.

5. A damper apparatus according to claim 3 wherein said closure element is substantially a spherical shell section.

6. A damper apparatus according to claim 1 wherein said closure element is substantially an elliptical shell section.

7. A damper apparatus according to claim 3 wherein said closure element is substantially an elliptical shell section.

8. A damper apparatus according to claim 1 wherein said actuating means and said linkage means are on the same side of said closure element.

9. A damper apparatus according to claim 1 wherein said linkage means comprises:
    means to couple said actuating means to said input port whereby said actuator axis is pivotable about a second reference axis, said second reference axis being parallel to said first reference axis and being on the same side of said closure element as said actuating means,
    connecting means for coupling said driving element to an extension member attached to said closure element and extending toward said actuating means along the central axis of said closure element, said coupling being pivotal about a third reference axis, said third reference axis being parallel to said first reference axis and intersecting said central axis, on the same side of said closure element as said second reference axis.

10. A damper apparatus according to claim 9 wherein said linkage means further comprises:
    first bar means, said first bar means being pivotally coupled at one end to said extension member about a fourth reference axis, said fourth reference axis being parallel to said first axis and intersecting with said central axis between said third axis and said closure element, and said first bar means being pivotally coupled at the other end about a fifth reference axis, said fifth reference axis being parallel to said first axis and fixed with respect to said input port,
    a second bar means, said second bar means being pivotally coupled at one end to said closure element about a sixth reference axis, said sixth reference axis being parallel to said first axis and displaced therefrom, and said second bar means being pivotally coupled at the other end about a seventh reference axis, said seventh reference axis being parallel to said first reference axis and fixed with respect to said input port.

11. An air damper apparatus for an air distribution system, comprising:
   a plate having a perimeter portion defining a circular opening in said plate,
   a closure element having a circular perimeter seatable on said plate perimeter portion,
   linear actuating means for selectively translating a driving element between first and second limit positions along an actuator axis extending in a direction generally perpendicular to the plane of said opening,
   connecting means for pivotally coupling said driving element about a pivot axis to the center of said closure element, said pivot axis being perpendicular and intersecting with said actuator axis,
   linkage means for coupling said closure element to said plate, said linkage means being adapted so that said closure element rotates about said pivot axis between a position with the plane of said closure element perimeter parallel to the plane of the perimeter of said opening, to a position with the plane of said closure element perimeter forming a nonzero angle with the plane of the perimeter of said opening in response to translation of said driving element between said limit positions, said linkage being further adapted so that said pivot axis translates in the direction of said actuator axis during such rotation, said linkage means including at least one base pivot member which is pivotable about a base axis, said base axis being fixed with respect to said plate.

12. The apparatus of claim 11 further including a sealing means, said sealing means being positioned to lie between the perimeter of said closure element and said perimeter portion when said drive element is in said inner limit position.

13. The system of claim 11 wherein said closure element is substantially a spherical shell section.

14. The system of claim 12 wherein said closure element is substantially a spherical shell section.

15. The apparatus according to claim 11 wherein said linkage means includes:
   a two-bar linkage, said two-bar linkage including a first and second bar, said first bar being fixedly coupled at one end to said closure element, and pivotally coupled at the other end to one end of said second bar, said second bar being pivotally coupled at the other end to be rotatable about a reference axis at said reference point, said reference axis being substantially parallel to said actuator axis.

16. The apparatus of claim 15 further including a sealing means, said sealing means being positioned to lie between the perimeter of said closure element and said perimeter portion when said drive element is in said inner limit position.

17. The system of claim 16 wherein said closure element is substantially a spherical shell section.

18. A damper system for an air distribution system comprising:
   an array of damper assemblies, each damper assembly including:
      A. A closure element having a perimeter portion seatable on the edge of said input port,
      B. an actuating means and associated driving element, said actuating means including a linear actuator and being responsive to an associated control signal to selectively move said driving element between first and second limit positions along an actuator axis, wherein the position of said driving element is related to said control signal,
      C. linkage means for coupling said closure element to said input port whereby said closure element is driven between first and second operating positions as said driving element passes between said first and second limit positions, said closure element being seated against said input port in said first operating position, and being linearly displaced from said input port and being rotationally displaced from said first operating position about a first reference axis parallel to the plane of said input port in said second operating position, said linkage means including at least one base pivot member which is pivotable about a base axis, said base axis being fixed with respect to said input port,
   a controller including means for selectively generating and applying said control signals to associated actuating means of said array of damper assembly.

19. A damper system according to claim 18 wherein said controller includes a programmed computer.

20. A damper system according to claim 18 wherein said controller further includes environmental parameter sensors, and wherein said controller is adaptively responsive to signals from said sensor to generate said control signals.

21. A damper system according to claim 19 wherein said controller further includes environmental parameter sensors, and wherein said controller is adaptively responsive to signals from said sensor to generate said control signals.

22. A damper system according to claim 18 wherein said controller further includes a means to generate timing signals, and wherein said controller is responsive to said timing signals to generate said control signals based on a selectable programmable time sequence.

23. A damper system according to claim 19 wherein said controller further includes a means to generate timing signals, and wherein said controller is responsive to said timing signals to generate said control signals based on a selectable programmable time sequence.

* * * * *